US008453549B2

(12) United States Patent
Hoshor

(10) Patent No.: US 8,453,549 B2
(45) Date of Patent: Jun. 4, 2013

(54) METHOD AND APPARATUS FOR SAWING LINEAL MATERIAL TO LENGTH

(75) Inventor: Steven T. Hoshor, Ames, IA (US)

(73) Assignee: Technical Services, Inc., Ames, IA (US)

( * ) Notice: Subject to any disclaimer, the term of this patent is extended or adjusted under 35 U.S.C. 154(b) by 571 days.

(21) Appl. No.: 12/353,006

(22) Filed: Jan. 13, 2009

(65) Prior Publication Data

US 2009/0178521 A1 Jul. 16, 2009

Related U.S. Application Data

(60) Provisional application No. 61/021,189, filed on Jan. 15, 2008.

(51) Int. Cl.
*F16P 3/20* (2006.01)
*B26D 7/02* (2006.01)

(52) U.S. Cl.
USPC .......... 83/464; 83/206; 83/471.2; 83/DIG. 1; 192/131 R; 361/189; 307/328

(58) Field of Classification Search
USPC .................. 83/370, 76.7, 76.9, DIG. 1, 465, 83/485, 435.11, 484, 487, 488, 431, 206, 83/471.2, 581, 464; 192/131 R, 131 H, 130, 192/129 A; 100/343–344; 409/134; 307/328; 340/573, 573.1; 361/179, 189
See application file for complete search history.

(56) References Cited

U.S. PATENT DOCUMENTS

| 2,962,633 | A | * | 11/1960 | Raymond | 361/189 |
| 3,728,498 | A | * | 4/1973 | Aslanbayrak et al. | 192/131 R |
| 3,838,723 | A | * | 10/1974 | Sandberg | 144/133.1 |
| 3,854,360 | A | * | 12/1974 | Reed | 83/468 |
| 3,901,140 | A | * | 8/1975 | Dohm, Jr. | 100/344 |
| 3,946,631 | A | * | 3/1976 | Malm | 83/380 |
| 3,987,696 | A | * | 10/1976 | Haas et al. | 83/532 |
| 4,074,602 | A | * | 2/1978 | Brower | 83/471.2 |
| 4,123,630 | A | * | 10/1978 | Mac Intyre et al. | 200/52 R |
| 4,195,722 | A | * | 4/1980 | Anderson et al. | 192/131 R |
| 4,463,636 | A | * | 8/1984 | Heller et al. | 83/13 |
| 4,637,288 | A | * | 1/1987 | Olsen et al. | 83/375 |
| 5,239,905 | A | * | 8/1993 | Dunn | 83/459 |
| 5,365,812 | A | * | 11/1994 | Harnden | 83/34 |
| 6,327,949 | B1 | * | 12/2001 | Abernathy | 83/452 |
| 7,031,789 | B1 | | 4/2006 | Dick et al. | |
| 7,171,738 | B2 | | 2/2007 | Dick et al. | |

FOREIGN PATENT DOCUMENTS

EP 683005 * 11/1995

* cited by examiner

*Primary Examiner* — Laura M. Lee
(74) *Attorney, Agent, or Firm* — McKee, Voorhees & Sease, P.L.C.

(57) ABSTRACT

An enhancement for use with automatically cycled saw systems that provides an operator access to two-hand anti-tie down buttons and other machine control functions while manually crowding the material to be cut against the saw's fence. The enhancement includes anti-tie down buttons to prevent a cutting cycle unless both buttons are depressed within preset time limit of each other.

9 Claims, 5 Drawing Sheets

METHOD AND APPARATUS FOR SAWING LINEAL MATERIAL TO LENGTH

CROSS REFERENCE TO RELATED APPLICATIONS

This application claims priority under 35 U.S.C. §119 to provisional application U.S. Ser. No. 61/021,189 filed Jan. 15, 2008, herein incorporated by reference in its entirety.

INCORPORATED BY REFERENCE

Please incorporate by reference the following in their entirety: U.S. Pat. No. 7,171,738 to Dick et al. issued Feb. 6, 2007; U.S. Pat. No. 4,736,511 to Jenkner issued April 1988; U.S. Pat. No. 4,830,075 to Jenkner issued May 1989; U.S. Pat. No. 6,640,855 to Giles issued November 2003; U.S. Application Publication No. 2003/0041919 to Giles published March 2003; and U.S. Pat. No. 7,031,789 to Dick et al. issued Apr. 1, 2006.

FIELD OF THE INVENTION

The present invention relates in general to methods and apparatus for sawing lineal material to length.

BACKGROUND OF THE INVENTION

Electrically powered crosscut saws have been in existence for decades and have been manufactured in many different configurations. In order to improve the productivity and consistency of cut on these saws many manufacturers have added apparatus both pneumatic and electromechanical to automatically cycle the rotating saw blade through the stock. This cut cycle has traditionally been initiated by a foot or knee pedal so that the operator's hands are free to manipulate the stock. While this configuration is effective for the efficient throughput of material through the saw, it does not prevent the operator from accidentally cycling the saw while his hands or arms are in harm's way.

To address this unsafe condition, manufacturers have offered these saws with a two-hand anti-tie down control that prevents the initiation of the cutting cycle unless two buttons spaced far enough apart to prevent one-handed operation are depressed simultaneously.

The logic circuit that monitors these buttons will not initiate the cycle unless both buttons are depressed within a few milliseconds of one another. This logic prevents the operator from defeating the system by tying one button down and then using only one hand to cycle the saw. Hence the name two-hand anti-tie down. This type of control is widely accepted throughout industry as a safe method for initiating a machine cycle.

Since the nature of the two-hand anti-tie down circuit is to ensure that the operator's hands are safely away from the process to prevent injury, their use on automatic saws prevents the operator from being able to hold the stock against the saw's fence while the cut is being performed. So in order to effectively implement this safety feature, manufacturers must add pneumatic clamping to the saw thereby adding significant cost and complexity to the product as well as reducing the throughput due to added motion on behalf of the operator.

From the foregoing, it can be seen that a need exists for further enhancements to the implementation of two-hand anti-tie down systems onto automatic saws in order to meet today's more rigorous safety requirements while maintaining or improving usability and productivity of the products.

BRIEF SUMMARY OF THE INVENTION

In accordance with the present invention, the disclosed sawing system enhancement, and the method of operation thereof, substantially reduce or eliminates the disadvantages and shortcomings associated with the prior art techniques. According to one aspect of the invention, the two buttons that are monitored by the anti-tie down circuit are mounted on handrests positioned above the work area and on either side of the cutting line. These hand rests are mounted on linear bearings that allow them to slide horizontally in a plane parallel to the saw blade and to the saw table top and perpendicular to the saw back fence. The hand rests may be joined together or they may move independently depending on the embodiment of the invention. Either integrated into the design of the hand rests or mechanically connected to the hand rests are mechanical features that extend down toward the table top to within a short distance of its surface. These features will come in contact with the stock to be cut as the operator applies forward force to the hand rests causing them to slide toward the back fence of the saw. In this way the operator can crowd stock against the saw's back fence yet still operate the two-hand anti-tie down switches positioned to keep his hands a safe distance from the cutting area.

In accordance with another aspect of the invention, additional buttons can be positioned on the hand rests to perform functions such as controlling a digitally controlled positioning device attached to the saw to position the stock to obtain a desired cut length. As an example the hand rests might include a JOG button and a NEXT PART button. The operator could place his stock on a positioning table next to the saw; depress the JOG button on the hand rest assembly, thereby feeding the stock toward the saw. When the stock is in a position where the saw will make a proper trim cut, the operator would release the JOG button stopping the forward motion of the stock. The operator would then initiate the saw cycle via the two-hand anti-tie down buttons on the hand rest to trim the end of the part. He would then depress the NEXT button on the hand rest signaling the digital positioner to advance the stock adequately to a position where a further saw cycle will produce a part of desired length. When the stock is in position, the operator would again initiate the saw cycle by simultaneously depressing the two-hand anti-tie down buttons. The operator has now produced a part with both ends cleaned up and of a proper length without having to remove his hands from the hand rests. This not only keeps the operator's hands a safe distance from the cutting area but also eliminates the time and effort required for him to manipulate the lineal stock manually

DETAILED DESCRIPTION OF THE PREFERRED EMBODIMENT

Details of the preferred embodiment of the present invention will now be discussed with reference to FIGS. 1-5.

Figure 1:
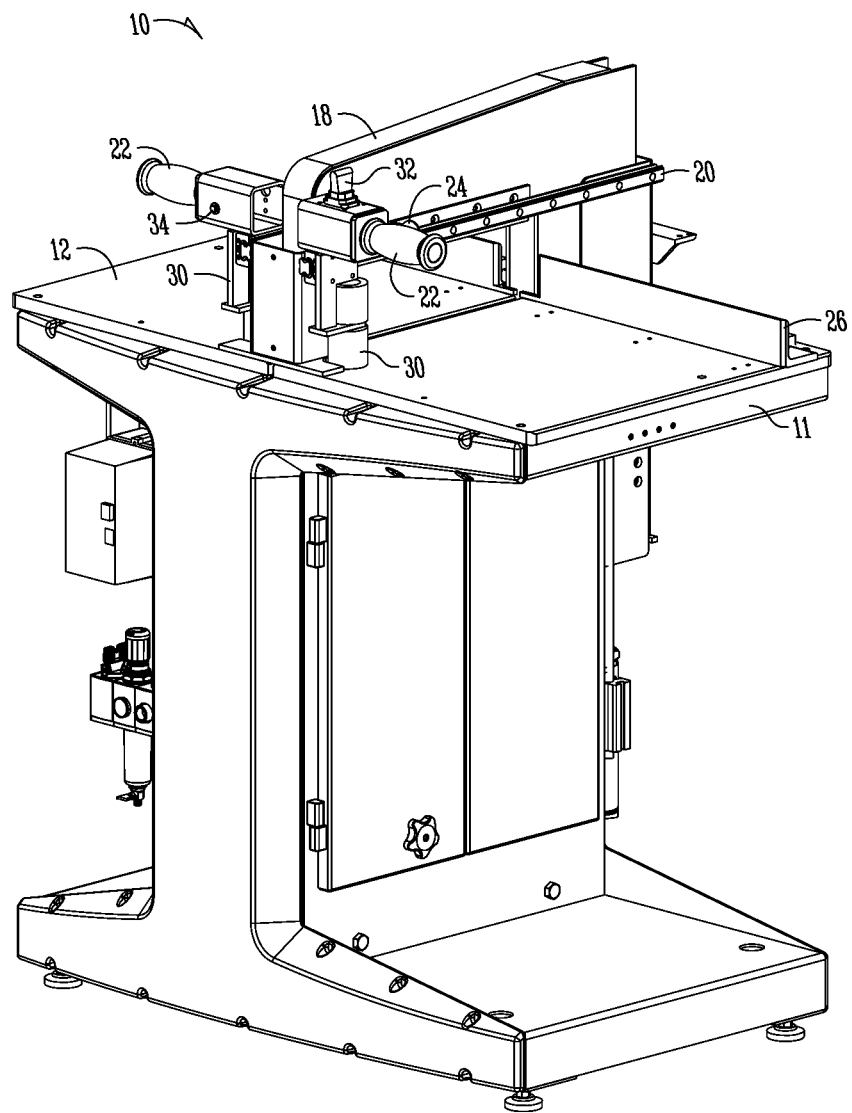
FIG. 1 shows a perspective view of the apparatus.
Figure 2:
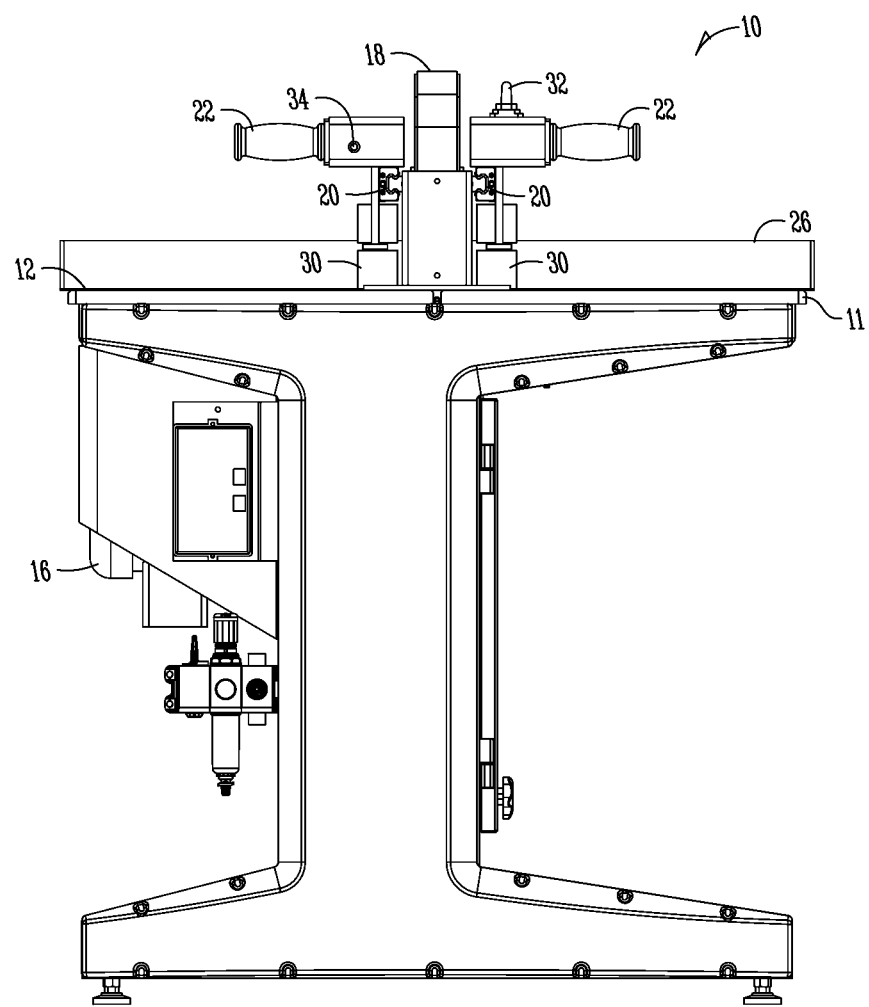
FIG. 2 shows a front view of the apparatus.
Figure 3:
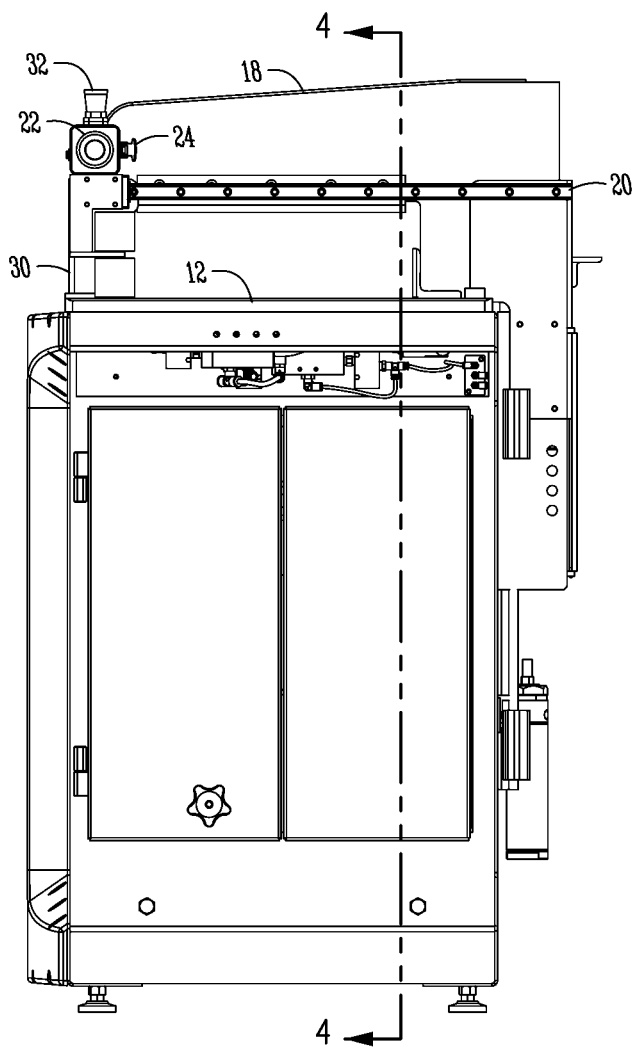
FIG. 3 shows an end view of the apparatus.
Figure 4:
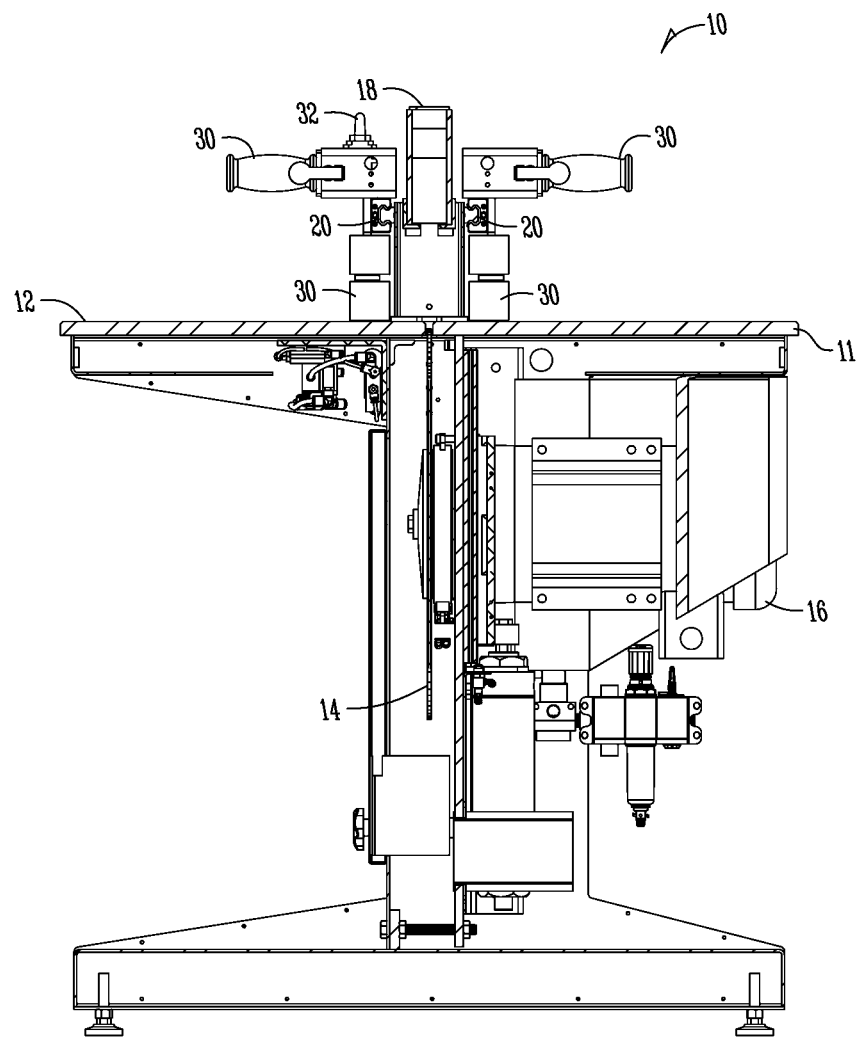
FIG. 4 shows a cutaway view of the apparatus taken along line 4-4 of FIG. 3.
Figure 5:
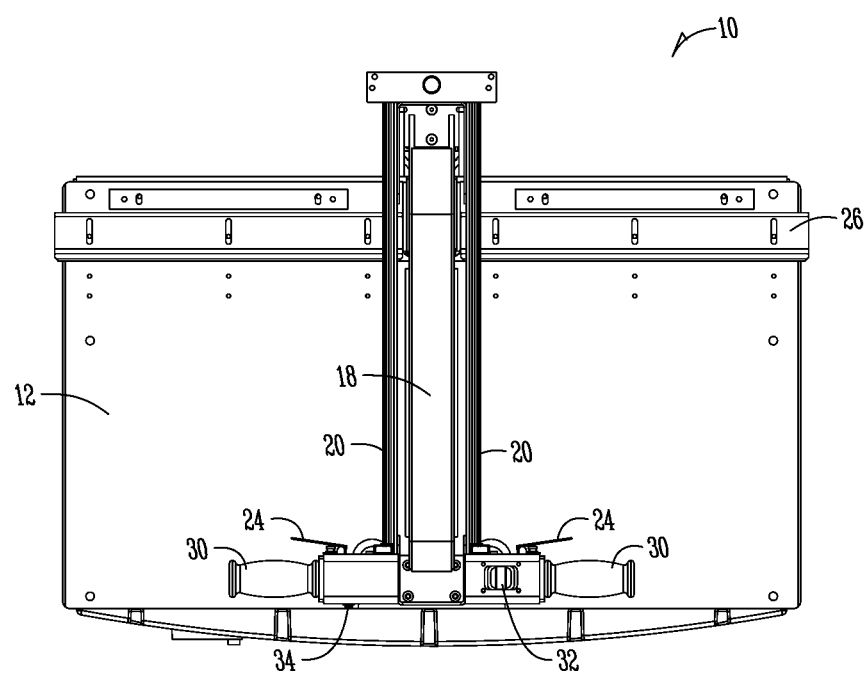
FIG. 5 shows a top view of the apparatus.

An improved safety device for an electrically powered crosscut saw is described and best shown in FIG. 1. An electrically powered crosscut saw 10 features a base 11 supporting a tabletop 12 through which a saw blade 14 (see FIG. 4) may pass in order to cut stock. The stock is secured by an operator against a back fence 26 so as to ensure a clean cut. A blade guard 18 is typically located on the tabletop 12 and aligned with the saw blade 14 such that when the saw blade 14 is cutting the stock, the operator is separated from the saw blade 14 by the blade guard 18. The blade guard 18 thereby protects the operator from debris during the cutting process, while also reducing the potential for contact between the operator and the saw blade 14. The blade guard 18 also acts as a top clamp and may move vertically to secure stock.

According to the preferred embodiment, a pair of rails 20 are located adjacent the blade guard 18 and do not move when the blade guard clamps the stock. Handles 22 are slideably attached to the rails 20. Mechanical arms 30 attached to the handles 22 allow the operator to secure the stock against the back fence 26 without removing his hands from the handles 22. A pair of anti-tie down buttons 24 are located on the handles 22 so that the anti-tie down buttons 24 must be depressed while the operator grips both handles 22. The anti-tie down buttons 24 are integrated into a pneumatic or electrical logic circuit ensuring that a cutting cycle cannot be engaged unless both anti-tie down buttons 24 are depressed substantially simultaneously (e.g. within 0.5 seconds). This safety measure ensures that an operator can not operate the saw blade 14 without having both hands on the handles 22. This setup drastically reduces the potential for injury while still allowing the operator to properly hold the stock against the back fence 26 during operation, without the use of additional clamping devices.

Additional buttons may also be incorporated onto the handles 22 or mechanical arms 30 for performing other tasks commonly associated with crosscut saws. For example, a digitally controlled positioning device may be implemented with the invention, the controls included on the handles 22. This digitally controlled positioning device might include a JOG button or toggle 32 and NEXT PART button 34; the buttons allowing the operator to advance the stock to be cut so as to eliminate knots in a piece while cutting pieces of a desired length.

During operation of the apparatus with the above described additional buttons, an operator, once finished with a part, would depress the JOG toggle 32 so as to advance the stock past a knot. The operator would then depress both of the anti-tie down buttons 24 together, engaging the motor 16 and cutting the stock to remove the defect. The operator would then depress the NEXT PART button 34, advancing the stock a predetermined length. The operator would again depress both of the anti-tie down buttons 24 simultaneously, engaging the motor 16 and cutting a finished part from the stock. The operator has thus formed a part of a proper length having both ends cleaned up without requiring the operator to remove his hands from the handles to position or secure the stock.

Included with the table saw is an optimization system which is capable of analyzing a piece of stock lumber in order to determine the optimal cut pattern so as to eliminate waste and avoid flaws in cut pieces. A computer terminal may be positioned adjacent to the operator stand. The optimization system includes an interface, such as a camera and image recognition software, for identifying defects in the stock. Once the defects have been identified, the computer program creates a cut pattern so as to optimize the usefulness of the board by eliminating waste.

One preferred method of operating an optimization system intended for use with the above described invention includes the steps of:

1) An electronic cutlist file is generated either manually or by some third party design software.
2) The cutlist is converted from a comma separated ascii file into a database file, such as Microsoft Excel. This step may be performed by either a desktop computer or integrated into the optimization system.
3) The database is sorted into groups according to criteria established by the user.
4) The operator chooses which group he wishes to process.
5) The operator puts the optimization system into DEFECT MODE and presses MOVE TO SCAN START.
6) The optimization system positions a pusher at the SCAN START position.
7) Mounted to the pusher is a line laser that casts a line across the table perpendicular to the fence.
8) The operator positions the stock alongside the pusher path with the end of the stock aligned with the line laser.
9) He then holds the NEXT button down and uses the joystick to jog the pusher (laser) to the point at which he intends the first trim cut to be made.
10) He then releases the NEXT button.
11) He then jogs the laser to the beginning of the first defect, depresses the NEXT button and holds it down until the laser has passed over the defect then releases it.
12) The operator repeats this process for all defects on the board including the tail trim.
13) Finally the operator uses the joystick to position the laser on the end of the board and presses the END OF BOARD/OPTIMIZE button which signals the software to calculate an optimized cutting solution based on the information gathered from the defecting process.
14) The optimized cutting solution then appears on the screen and the operator now uses the next button to advance the stock for trimming and cutting the parts from the board.

In order to make a cut according to the preferred embodiment, the operator first advances the stock to a cut position, either by the JOG 32 or NEXT PART 34 buttons or by manually advancing the stock. The operator then pushes the handles 22 forward, causing the mechanical arms 30 to contact the stock. The mechanical arms 30 allows the operator to crowd the stock against the back fence 26, preventing the stock from moving during the cut, thereby reducing the chance of splintering or injury. The blade guard 18 may also provide clamping of the stock. Finally, the operator depresses both of the anti-tie-down buttons 24 simultaneously. These anti-tie-down buttons 24 communicate to the machine that the operator has both hands on the hand rests, and that it is safe to engage the cutting cycle. If the operator should remove his hands from either of the anti-tie-down buttons the saw blade will be retracted, stopped, or otherwise safely removed from a zone of danger about the operator.

Other precautions eliminate the potential for the operator to override the anti-tie-down buttons. The buttons must be depressed substantially simultaneously (e.g. within 0.5 seconds), so that the operator cannot press one button and then the next with one hand. Also, if one or both buttons are depressed for a long time (e.g. more than a minute) relative to the cycle time of the saw, the system will shut down. This prevents the operator from tying, taping, gluing, or otherwise fixing one or both buttons into an "on" position to circumvent this safety precaution.

The above described invention is exemplary and other variations of the invention may be appreciated by those skilled in the art. Any limitations of the present invention appear in the claims as allowed.

What is claimed is:

1. A saw having a circular cutting blade turned by a motor and a horizontal table having a slot through which a part of said circular cutting blade may pass, said table saw comprising:
    a blade guard positioned above the table;
    a pair of rails running parallel to both said cutting table and one another;
    a pair of handles slidably affixed to said rails, at least one of said handles including a point of contact to secure a work piece during a cutting cycle, whereby said handles further comprise a pair of mechanical arms operatively connected to said handles so as to crowd a work piece to be cut against a back fence during operation of said table saw;
    an anti-tie down button located on each of said handles;
    a logic circuit integrating said anti-tie down buttons and said circular cutting blade for engaging the cutting cycle;
    said logic circuit preventing said cutting cycle from being engaged unless both anti-tie down buttons are depressed within a preset time limit of each other.

2. The saw of claim 1 wherein said back fence is perpendicular to said table for holding stock during cutting.

3. The saw of claim 1 whereby said pair of handles is configured so as to move together.

4. The saw of claim 1 whereby said pair of handles is configured so as to be separately movable.

5. The saw of claim 1 whereby said buttons are located to keep both hands safely out of reach of the saw blade.

6. A method of using a saw comprising the steps of:
providing a saw having a circular cutting blade turned by a motor and a horizontal table having a slot through which a part of said circular cutting blade may pass, said saw including:
    a blade guard positioned above the table;
    a pair of rails running parallel to both said cutting table and one another;
    a pair of handles slidably affixed to said rails, at least one of said handles including a point of contact to secure work piece during a cutting cycle:
    an anti-tie down button located on each of said handles;
    a logic circuit integrating said anti-tie down buttons and said circular cutting blade for engaging the cutting cycle;
    said logic circuit preventing said cutting cycle from being engaged unless both anti-tie down buttons are depressed within a preset time limit of each other;
loading a work piece onto the table;
sliding said handles along said guard, thereby causing mechanical arms to crowd said work piece against a back fence;
depressing both of said anti-tie down buttons within to preset time, thus engaging a cutting cycle to cause said blade to cut said work piece.

7. The method of claim 6 further comprising the step of depressing both of said anti-tie down buttons substantially simultaneously thereby causing said blade to cut said work piece.

8. The method of claim 7 further comprising the steps of releasing both of said anti-tie down buttons; and removing the cut piece.

9. The method of claim 7 further comprising the step of advancing the work piece without needing to unclamp and reclamp any component extending from handles.

* * * * *

UNITED STATES PATENT AND TRADEMARK OFFICE
CERTIFICATE OF CORRECTION

PATENT NO. : 8,453,549 B2
APPLICATION NO. : 12/353006
DATED : June 4, 2013
INVENTOR(S) : Steven T. Hoshor Page 1 of 1

It is certified that error appears in the above-identified patent and that said Letters Patent is hereby corrected as shown below:

In the Claims:

<u>Col 6, Claim 6, Line 23:</u>
DELETE after within "to"
ADD after within --a--

Signed and Sealed this
Twenty-third Day of July, 2013

Teresa Stanek Rea
*Acting Director of the United States Patent and Trademark Office*